United States Patent
Asano et al.

(10) Patent No.: US 9,103,954 B2
(45) Date of Patent: Aug. 11, 2015

(54) CELL FOR LIGHT-EMITTING DEVICE AND LIGHT-EMITTING DEVICE

(75) Inventors: Hideki Asano, Otsu (JP); Masanori Wada, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 119 days.

(21) Appl. No.: 14/128,638

(22) PCT Filed: May 24, 2012

(86) PCT No.: PCT/JP2012/063319

§ 371 (c)(1),
(2), (4) Date: Dec. 23, 2013

(87) PCT Pub. No.: WO2013/005494

PCT Pub. Date: Jan. 10, 2013

(65) Prior Publication Data

US 2014/0133159 A1    May 15, 2014

(30) Foreign Application Priority Data

Jul. 1, 2011 (JP) .................................. 2011-147328

(51) Int. Cl.
F21V 3/00 (2015.01)
G02B 7/00 (2006.01)
F21V 9/16 (2006.01)
(Continued)

(52) U.S. Cl.
CPC .............. *G02B 7/006* (2013.01); *C03B 23/245* (2013.01); *C09K 11/883* (2013.01); *F21V 9/16* (2013.01)

(58) Field of Classification Search
CPC ..... H01L 33/50; H01L 33/505; C03B 23/203; C03C 27/06; C09K 11/00

USPC .......... 362/317, 318, 311.02, 311.04, 311.05, 362/231, 84; 438/29

See application file for complete search history.

(56) References Cited

U.S. PATENT DOCUMENTS 3,868,676 A * 2/1975 Hennessey et al. .............. 345/43
3,872,339 A * 3/1975 Maloney ....................... 313/584
(Continued)

FOREIGN PATENT DOCUMENTS

JP    2005-093681 A    4/2005
JP    2008-041626 A    2/2008
(Continued)

OTHER PUBLICATIONS

English translation of Official Communication issued in corresponding International Application PCT/JP2012/063319, mailed on Jan. 16, 2014.
(Continued)

*Primary Examiner* — Ali Alavi
(74) *Attorney, Agent, or Firm* — Keating & Bennett, LLP

(57) ABSTRACT

The present invention can further increase the efficiency of light extraction from the light exit surface of a light-emitting device. A cell (10) for a light-emitting device includes: a first main wall (10a) and a second main wall (10b) which are disposed facing each other with a distance therebetween; and a sidewall (10c). The sidewall (10c) connects the first main wall (10a) and the second main wall (10b). The sidewall (10c) defines, together with the first and second main walls (10a, 10b), an internal space (10A) into which a luminescent substance is to be encapsulated. A portion of the sidewall (10c) located laterally of the internal space (10A) is white.

9 Claims, 2 Drawing Sheets

(51) Int. Cl.
*C03B 23/24* (2006.01)
*C09K 11/88* (2006.01)

(56) References Cited

U.S. PATENT DOCUMENTS

| | | | | |
|---|---|---|---|---|
| 4,839,557 | A * | 6/1989 | Schrank | 313/509 |
| 6,127,005 | A * | 10/2000 | Lehman et al. | 427/553 |
| 6,245,699 | B1 * | 6/2001 | Hudecek et al. | 501/18 |
| 6,631,022 | B1 * | 10/2003 | Kihira et al. | 359/265 |
| 6,929,524 | B2 * | 8/2005 | Ando | 445/24 |
| 6,936,407 | B2 * | 8/2005 | Pichler | 430/311 |
| 7,407,839 | B2 * | 8/2008 | Akiyama et al. | 438/149 |
| 8,568,184 | B2 * | 10/2013 | Prest et al. | 445/25 |
| 8,993,367 | B2 * | 3/2015 | Asano et al. | 438/69 |
| 9,006,970 | B2 * | 4/2015 | Song et al. | 313/512 |
| 2004/0257797 | A1 * | 12/2004 | Suehiro et al. | 362/34 |
| 2006/0001761 | A1 * | 1/2006 | Haba et al. | 348/340 |
| 2006/0284556 | A1 * | 12/2006 | Tremel et al. | 313/512 |
| 2007/0002257 | A1 * | 1/2007 | Oh et al. | 349/153 |
| 2007/0091062 | A1 * | 4/2007 | French et al. | 345/107 |
| 2007/0173167 | A1 * | 7/2007 | Choi | 445/25 |
| 2007/0273281 | A1 * | 11/2007 | Biebel | 313/512 |
| 2008/0150419 | A1 * | 6/2008 | Kang | 313/504 |
| 2008/0171485 | A1 * | 7/2008 | Choi et al. | 445/24 |
| 2008/0231176 | A1 * | 9/2008 | Lee et al. | 313/504 |
| 2008/0297042 | A1 * | 12/2008 | Ahn et al. | 313/504 |
| 2008/0305706 | A1 * | 12/2008 | Nonomura et al. | 445/24 |
| 2009/0059341 | A1 * | 3/2009 | Kinugawa et al. | 359/245 |
| 2009/0069164 | A1 * | 3/2009 | Lamberson et al. | 501/15 |
| 2009/0086325 | A1 * | 4/2009 | Liu et al. | 359/599 |
| 2009/0148682 | A1 * | 6/2009 | Higuchi | 428/213 |
| 2009/0218932 | A1 * | 9/2009 | Wang | 313/504 |
| 2009/0221207 | A1 * | 9/2009 | Russell et al. | 445/25 |
| 2010/0270919 | A1 * | 10/2010 | Hubert et al. | 313/512 |

FOREIGN PATENT DOCUMENTS

| | | |
|---|---|---|
| JP | 2008-108835 A | 5/2008 |
| JP | 2011-014767 A | 1/2011 |

OTHER PUBLICATIONS

Official Communication issued in International Patent Application No. PCT/JP2012/063319, mailed on Jun. 19, 2012.

* cited by examiner

CELL FOR LIGHT-EMITTING DEVICE AND LIGHT-EMITTING DEVICE

TECHNICAL FIELD

This invention relates to a cell for a light-emitting device and a light-emitting device with the same.

BACKGROUND ART

In recent years, as a white light source for use in, for example, a backlight of a liquid crystal display, a light source has been known in which an LED (light emitting diode) capable of emitting a blue light is combined with a light-emitting device capable of absorbing the blue light from the LED and emitting a yellow light (see, for example, Patent Literature 1). Emitted from such a white light source is a white light which is a synthesized light of the blue light emitted from the LED and then transmitted through the light-emitting device and the yellow light emitted from the light-emitting device.

CITATION LIST

Patent Literature

Patent Literature 1: JP-A 2011-14767

SUMMARY OF INVENTION

Technical Problem

A possible light-emitting device capable of absorbing a blue light and emitting a yellow light is one in which a luminescent material, such as phosphor or quantum dot, is encapsulated in a cell.

Recently, there are increasing demands to further increase the efficiency of light extraction from the light exit surface of the light-emitting device in order to further increase the brightness of the light source.

The present invention has been made in view of the above point and an object thereof is to further increase the efficiency of light extraction from the light exit surface of the light-emitting device.

Solution to Problem

A cell for a light-emitting device of the present invention is a cell for a light-emitting device into which a luminescent substance is to be encapsulated. The cell for a light-emitting device of the present invention includes a first main wall, a second main wall, and a sidewall. The first main wall and the second main wall are disposed facing each other with a distance therebetween. The sidewall connects the first main wall and the second main wall. The sidewall defines, together with the first and second main walls, an internal space into which the luminescent substance is to be encapsulated. A portion of the sidewall located laterally of the internal space is white. A portion of the sidewall facing the internal space is preferably white. Furthermore, the entire sidewall is preferably white.

The portion of the sidewall located laterally of the internal space preferably contains at least one of white glass and white ceramic. The term white glass herein includes white crystallized glass.

The cell for a light-emitting device of the present invention may include: a first main wall member forming the first main wall; a second main wall member forming the second main wall; and a white sidewall member disposed between a peripheral portion of the first main wall member and a peripheral portion of the second main wall member, connecting the first main wall member and the second main wall member, and forming a portion of the sidewall.

The cell for a light-emitting device of the present invention may include: a first main wall member forming the first main wall; a second main wall member forming the second main wall; and a white sidewall member disposed to surround the first and second main wall members, joined to end surfaces of the first and second main wall members, and forming the sidewall.

A light-emitting device of the present invention includes: the cell for a light-emitting device of the present invention; and a luminescent substance encapsulated in the internal space of the cell for a light-emitting device. The luminescent substance is preferably formed of an inorganic phosphor. The inorganic phosphor is preferably formed of quantum dot.

Advantageous Effects of Invention

The present invention can further increase the efficiency of light extraction from the light exit surface of the light-emitting device.

DESCRIPTION OF EMBODIMENTS

Hereinafter, a description will be given of an example of a preferred embodiment for working of the present invention. However, the following embodiments are simply illustrative. The present invention is not at all intended to be limited to the following embodiments.

First Embodiment

Figure 1:
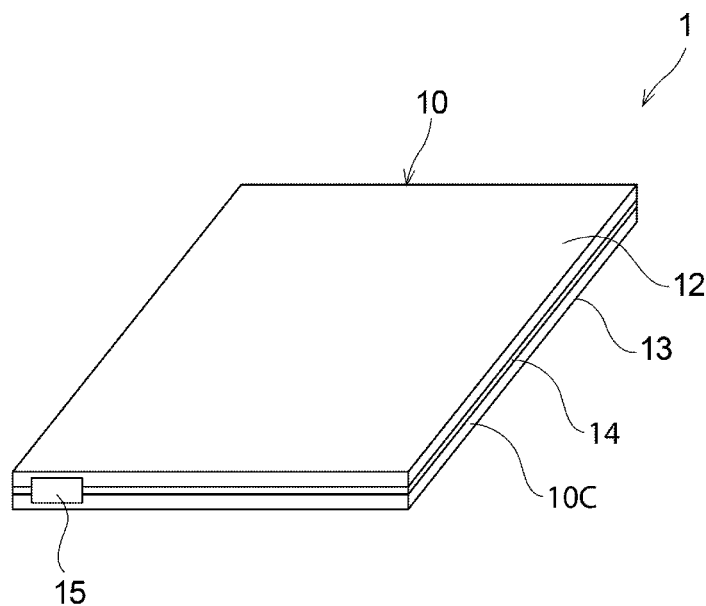
FIG. 1 is a schematic perspective view of a light-emitting device according to a first embodiment.
Figure 2:
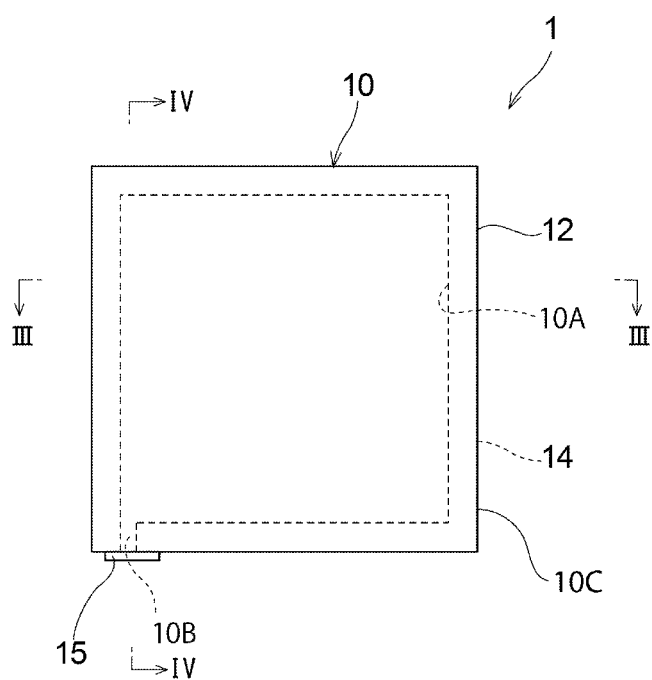
FIG. 2 is a schematic plan view of the light-emitting device according to the first embodiment.
Figure 3:
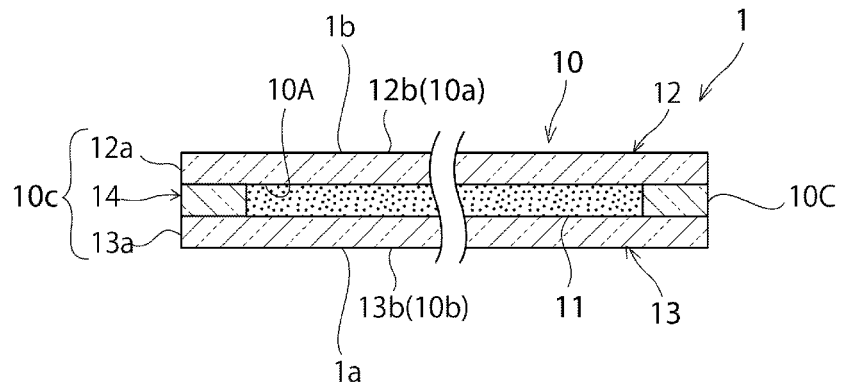
FIG. 3 is a schematic cross-sectional view taken along the line III-III in FIG. 2.
Figure 4:
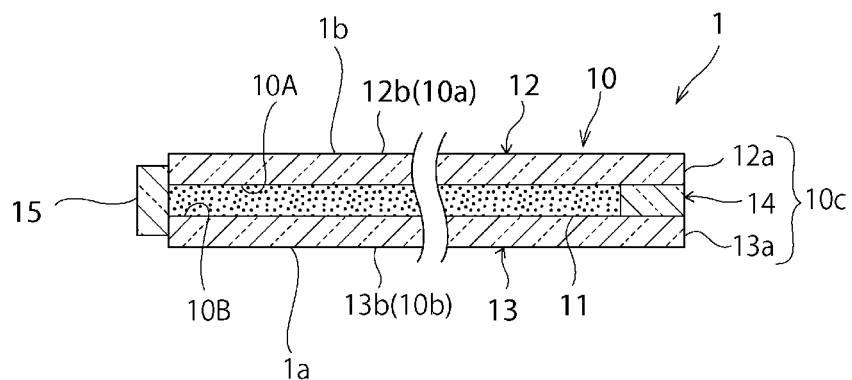
FIG. 4 is a schematic cross-sectional view taken along the line IV-IV in FIG. 2.

FIG. 1 is a schematic perspective view of a light-emitting device according to a first embodiment. FIG. 2 is a schematic plan view of the light-emitting device according to the first embodiment. FIG. 3 is a schematic cross-sectional view taken along the line III-III in FIG. 2. FIG. 4 is a schematic cross-sectional view taken along the line IV-IV in FIG. 2. First with reference to FIGS. 1 to 4, the structure of a light-emitting device 1 according to this embodiment is described.

The light-emitting device 1 is a device configured to, upon incidence of excitation light, emit light having a different wavelength from that of the excitation light. More specifically, the light-emitting device 1 is a device configured to, upon incidence of excitation light on its light entrance surface 1a, emit mixed light of the excitation light transmitted through the light-emitting device and luminescence of the light-emitting device as area light from its light exit surface 1b.

The light-emitting device 1 includes a cell 10 for a light-emitting device. The cell 10 has an internal space 10A. A luminescent substance is encapsulated in the internal space 10A. Specifically, encapsulated in the internal space 10A is a luminescent material 11 which contains a dispersion medium and a plurality of luminescent substance particles dispersed in the dispersion medium.

The luminescent substance emits, upon incidence of excitation light, light having a different wavelength from that of the excitation light. No particular limitation is placed on the type of the luminescent substance. Examples of the luminescent substance include phosphors, such as, for example, inorganic phosphors and organic phosphors. Of these phosphors, the preferred are inorganic phosphors.

Specific examples of the inorganic phosphor which produces a blue visible light (fluorescence having a wavelength of 440 to 480 nm) upon irradiation with an ultraviolet to near-ultraviolet excitation light having a wavelength of 300 to 440 nm include $Sr_5(PO_4)_3Cl:Eu^{2+}$ and $(Sr, Ba)MgAl_{10}O_{17}:Eu^{2+}$. Specific examples of the inorganic phosphor which produces a green fluorescence (fluorescence having a wavelength of 500 nm to 540 nm) upon irradiation with an ultraviolet to near-ultraviolet excitation light having a wavelength of 300 to 440 nm include $SrAl_2O_4:Eu^{2+}$ and $SrGa_2S_4:Eu^{2+}$. Specific examples of the inorganic phosphor which produces a green visible light (fluorescence having a wavelength of 500 nm to 540 nm) upon irradiation with a blue excitation light having a wavelength of 440 to 480 nm include $SrAl_2O_4:Eu^{2+}$ and $SrGa_2S_4:Eu^{2+}$. A specific example of the inorganic phosphor which produces a yellow visible light (fluorescence having a wavelength of 540 nm to 595 nm) upon irradiation with an ultraviolet to near-ultraviolet excitation light having a wavelength of 300 to 440 nm is $ZnS:Eu^{2+}$. A specific example of the inorganic phosphor which produces a yellow visible light (fluorescence having a wavelength of 540 nm to 595 nm) upon irradiation with a blue excitation light having a wavelength of 440 to 480 nm is $Y_3(Al, Gd)_5O_{12}:Ce^{2+}$. Specific examples of the inorganic phosphor which produces a red visible light (fluorescence having a wavelength of 600 nm to 700 nm) upon irradiation with an ultraviolet to near-ultraviolet excitation light having a wavelength of 300 to 440 nm include $Gd_3Ga_4O_{12}:Cr^{3+}$ and $CaGa_2S_4:Mn^{2+}$. Specific examples of the inorganic phosphor which produces a red visible light (fluorescence having a wavelength of 600 nm to 700 nm) upon irradiation with a blue excitation light having a wavelength of 440 to 480 nm include $Mg_2TiO_4:Mn^{4+}$ and $K_2SiF_6:Mn^{4+}$. The inorganic phosphors that can be used are those having a particle size of about 5 μm to about 50 μm.

Alternatively, the inorganic phosphor may be quantum dot. The quantum dot can emit, upon incidence of excitation light, light having a different wavelength from that of the excitation light and the wavelength of light emitted from the quantum dot depends upon the particle size of the quantum dot. In other words, by changing the particle size of the quantum dot, the wavelength of light to be obtained can be controlled. Therefore, the particle size of the quantum dot is selected to be a particle size meeting a desired wavelength of light. The quantum dot is generally less likely to be degraded by the contact with oxygen.

Examples of the quantum dot that can be used include those having a particle size of about 2 nm to about 10 nm. Specific examples of the quantum dot which produces a blue visible light (fluorescence having a wavelength of 440 to 480 nm) upon irradiation with an ultraviolet to near-ultraviolet excitation light having a wavelength of 300 to 440 nm include CdSe nanocrystals having a particle size of about 2.0 nm to about 3.0 nm. Specific examples of the quantum dot which produces a green visible light (fluorescence having a wavelength of 500 nm to 540 nm) upon irradiation with an ultraviolet to near-ultraviolet excitation light having a wavelength of 300 to 440 nm or a blue light having a wavelength of 440 to 480 nm include CdSe nanocrystals having a particle size of about 3.0 nm to about 3.3 nm. Specific examples of the quantum dot which produces a yellow visible light (fluorescence having a wavelength of 540 nm to 595 nm) upon irradiation with an ultraviolet to near-ultraviolet excitation light having a wavelength of 300 to 440 nm or a blue light having a wavelength of 440 to 480 nm include CdSe nanocrystals having a particle size of about 3.3 nm to about 4.5 nm. Specific examples of the quantum dot which produces a red visible light (fluorescence having a wavelength of 600 nm to 700 nm) upon irradiation with an ultraviolet to near-ultraviolet excitation light having a wavelength of 300 to 440 nm or a blue light having a wavelength of 440 to 480 nm include CdSe nanocrystals having a particle size of about 4.5 nm to about 10 nm.

A single type or a plurality of types of luminescent substances may be encapsulated in the internal space 10A. For example, if a white light having excellent color rendition is to be produced by irradiation with an ultraviolet to near-ultraviolet excitation light, respective luminescent substances capable of producing blue, green, and red visible lights (fluorescences) by irradiation with the ultraviolet to near-ultraviolet excitation light can be used in combination. Alternatively, if a white light having excellent color rendition is to be produced by irradiation with a blue excitation light, respective luminescent substances capable of producing green and red visible lights (fluorescences) by irradiation with the blue excitation light can be used in combination.

No particular limitation is placed on the type of the dispersion medium so long as it can suitably disperse the luminescent substance. The dispersion medium may be in liquid form or may be made of resin, glass or other materials.

No particular limitation is placed on the type of the cell 10 so long as it can transmit excitation light for the luminescent substance and light emitted from the luminescent substance. The cell 10 can be made of, for example, resin, glass or ceramic. Among these materials, glass is highly light-transmissive and has excellent workability, weatherability, and so on. Therefore, the cell 10 is preferably made of glass.

As shown in FIGS. 3 and 4, the cell 10 includes: a first main wall 10a forming the light exit surface 1b; and a second main wall 10b forming the light entrance surface 1a. The first main wall 10a and the second main wall 10b are disposed facing each other with a distance therebetween. The first main wall 10a and the second main wall 10b are parallel to each other. The outside principal surfaces of these first and second main walls 10a and 10b form the light exit and entrance surfaces.

The first main wall 10a and the second main wall 10b are surrounded by a sidewall 10c forming the outer side surface 10C of the cell 10. The sidewall 10c connects the first main wall 10a and the second main wall 10b. The sidewall 10c and the first and second main walls 10a and 10b define the internal space 10A of approximately cuboidal shape.

The thickness of the internal space 10A is about 0.05 mm to about 1.0 mm. The thickness of the internal space 10A is about 1/50 to about 19/20 of the thickness of the cell.

In this embodiment, specifically, the cell 10 is composed of a first main wall member 12, a second main wall member 13, and a sidewall member 14 in the shape of a picture frame. The sidewall member 14 is disposed between a peripheral portion 12a of the first main wall member 12 and a peripheral portion 13a of the second main wall member 13. The sidewall member 14 connects the peripheral portion 12a of the first main wall member 12 and the peripheral portion 13a of the second main wall member 13. The sidewall member 14, the peripheral portion 12a of the first main wall member 12, and the peripheral portion 13a of the second main wall member 13 form the sidewall 10c. The first main wall 10a is formed of a central portion 12b of the first main wall member 12. The second main wall 10b is formed of a central portion 13b of the second main wall member 13.

In this embodiment, the sidewall member 14 contains at least one of white glass and white ceramic. This sidewall member 14 forms a portion of the sidewall 10c located laterally of the internal space 10A. Therefore, the portion of the sidewall 10c located laterally of the internal space 10A is white. Furthermore, the sidewall member 14 faces the internal space 10A. Therefore, a portion of the sidewall 10c facing the internal space 10A is white.

If the entire sidewall member 14 is light transmissive, part of light from the luminescent substance will pass through the sidewall member 14 and will be then emitted through the outer side surface 10C of the cell 0 to the outside thereof. Thus, the amount of light to be emitted through the light exit surface will be reduced. Particularly if the luminescent substance is made of particulate phosphor or quantum dot, each of the excitation light and the luminescence will be scattered by the phosphor or the quantum dot, which will increase the amount of light emitted through the outer side surface of the cell to the outside. Thus, the amount of light to be emitted through the light exit surface 1b will be further reduced. Therefore, the efficiency of light extraction from the light exit surface 1b of the light-emitting device 1 will be reduced.

Unlike the above case, in the light-emitting device 1 of this embodiment, the portion of the sidewall 10c located laterally of the internal space 10A is white. Therefore, light coming from the internal space 10A toward the sidewall 10c is reflected toward the cell 10 by the sidewall 10c. Thus, leakage of light through the outer side surface 10C can be reduced. Hence, the efficiency of light extraction from the light exit surface 1b can be increased.

Particularly in this embodiment, the portion of the sidewall 10c facing the internal space 10A is white. In other words, the surface of the sidewall 10c facing the internal space 10A serves as a light reflecting surface. Therefore, light from the internal space 10A can be more efficiently reflected by the sidewall 10c. Thus, the leakage of light through the outer side surface 10C can be more effectively reduced. Hence, the efficiency of light extraction from the light exit surface 1b can be further increased.

The sidewall member 14 is preferably made of white crystallized glass. In this case, the mechanical strength of the peripheral portion can be increased, which prevents breakage of the cell during handling.

Next, a description will be given of an example of a method for producing the light-emitting device 1 according to this embodiment. However, the following production method is simply illustrative and the method for producing a light-emitting device according to the present invention is not at all limited by the following production method.

First, a main wall member 13 is prepared. Next, a glass ribbon for forming a sidewall member 14 is placed on a peripheral portion of the main wall member 13.

Next, another main wall member 12 is laid over the main wall member 13 with the white glass ribbon therebetween. Thereafter, the glass ribbon and at least one of the main wall members 12 and 13 are heated and melted, for example, by the application of laser, such as $CO_2$ laser, to the glass ribbon, so that the glass ribbon is fused to the main wall members 12 and 13. Thus, a cell 10 is produced.

Instead of the glass ribbon, glass paste containing a white pigment and filler powder, such as $TiO_2$, may be placed. In this case, a sidewall member 14 fused to the main wall members 12 and 13 can be formed by heating the glass paste to extract organic components away from it and melt its glass component(s).

Next, a luminescent substance is encapsulated through a through hole 10B into the internal space 10A. No particular limitation is placed on the method for encapsulating the luminescent substance but an example is a method of, with the internal space 10A placed in a reduced-pressure atmosphere, supplying a luminescent substance-dispersed liquid into the internal space 10A.

Finally, a sealing member 15 is placed to cover the through hole (encapsulating hole) 10B and irradiated with laser to fuse the sealing member 15 to the cell 10 and thus seal the through hole 10B. As a result of the above steps, a light-emitting device 1 can be produced.

Hereinafter, a description will be given of another example of a preferred embodiment for working of the present invention. In the following description, elements having substantially the same functions as those in the first embodiment are referred to by the common references and further explanation thereof will be omitted.

Second Embodiment

Figure 5:
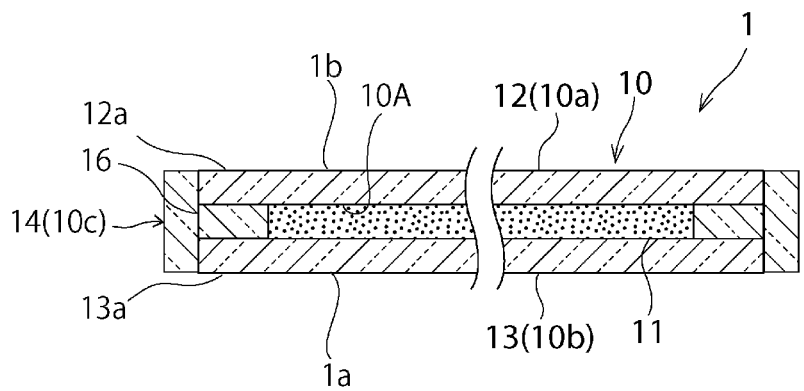
FIG. 5 is a schematic cross-sectional view of a light-emitting device according to a second embodiment.

FIG. 5 is a schematic cross-sectional view of a light-emitting device according to a second embodiment.

The first embodiment has described an example where the sidewall 10c is composed of the peripheral portions 12a and 13a of the first and second main walls 12 and 13 and the sidewall member 14. However, the present invention is not limited to this structure.

In this embodiment, the white sidewall member 14 is disposed to surround the first and second main wall members 12 and 13. The sidewall member 14 is joined to the end surfaces of the first and second main wall members 12 and 13. Thus, the sidewall member 14 forms the whole of the sidewall 10c. The first main wall 10a is formed of the whole of the first main wall member 12. The second main wall 10b is formed of the whole of the second main wall member 13.

As just described, in this embodiment, the white sidewall member 14 forms the whole of the sidewall 10c. Therefore, the entire sidewall 10c is white. Thus, leakage of light through the outer side surface 10C of the cell 10 can be reduced. Hence, the efficiency of light extraction from the light exit surface 1b can be further increased.

In this embodiment, a spacer 16 formed such as of transparent glass ribbon capable of transmitting excitation light and luminescence is placed between the first main wall member 12 and the second main wall member 13. This spacer 16 keeps the distance between the first main wall 12 and the second main wall 13 constant.

REFERENCE SIGNS LIST

1 . . . light-emitting device
1a . . . light entrance surface
1b . . . light exit surface
10 . . . cell
10a . . . first main wall
10b . . . second main wall
10c . . . sidewall
10A . . . internal space
10B . . . through hole
10C . . . outer side surface
11 . . . luminescent material
12, 13 . . . main wall member
14 . . . sidewall member 15 . . . sealing member
16 . . . spacer

The invention claimed is:

1. A cell for a light-emitting device into which a luminescent substance is to be encapsulated, the cell comprising:
 a first main wall and a second main wall which are disposed facing each other with a distance therebetween; and
 a sidewall which connects the first main wall and the second main wall and defines, together with the first and second main walls, an internal space into which the luminescent substance is to be encapsulated,
 wherein a portion of the sidewall located laterally of the internal space is white.

2. The cell for a light-emitting device according to claim 1, wherein a portion of the sidewall facing the internal space is white.

3. The cell for a light-emitting device according to claim 1, wherein the entire sidewall is white.

4. The cell for a light-emitting device according to claim 1, wherein the portion of the sidewall located laterally of the internal space contains at least one of white glass and white ceramic.

5. The cell for a light-emitting device according to claim 1, comprising:
 a first main wall member forming the first main wall;
 a second main wall member forming the second main wall; and
 a white sidewall member disposed between a peripheral portion of the first main wall member and a peripheral portion of the second main wall member, connecting the first main wall member and the second main wall member, and forming a portion of the sidewall.

6. The cell for a light-emitting device according to claim 1, comprising:
 a first main wall member forming the first main wall;
 a second main wall member forming the second main wall; and
 a white sidewall member disposed to surround the first and second main wall members, joined to end surfaces of the first and second main wall members, and forming the sidewall.

7. A light-emitting device comprising:
 the cell for a light-emitting device according to claim 1; and
 a luminescent substance encapsulated in the internal space of the cell for a light-emitting device.

8. The light-emitting device according to claim 7, wherein the luminescent substance is formed of an inorganic phosphor.

9. The light-emitting device according to claim 8, wherein the inorganic phosphor is formed of quantum dot.

* * * * *